(12) United States Patent
Lamp

(10) Patent No.: US 7,948,383 B2
(45) Date of Patent: May 24, 2011

(54) RFID TAG ASSEMBLY AND METHOD OF MANAGING A RACE

(75) Inventor: Shauna L. Lamp, Alliance, OH (US)

(73) Assignee: Miller Products, Inc., Sebring, OH (US)

( * ) Notice: Subject to any disclaimer, the term of this patent is extended or adjusted under 35 U.S.C. 154(b) by 255 days.

(21) Appl. No.: 12/136,805

(22) Filed: Jun. 11, 2008

(65) Prior Publication Data

US 2009/0309735 A1    Dec. 17, 2009

(51) Int. Cl.
*G08B 13/14*    (2006.01)
(52) U.S. Cl. ............... 340/572.8; 340/10.52; 40/633
(58) Field of Classification Search ............... 340/572.8, 340/572.1, 10.52; 40/633; 283/75
See application file for complete search history.

(56) References Cited

U.S. PATENT DOCUMENTS

| | | | |
|---|---|---|---|
| 2008/0309065 A1* | 12/2008 | Ali et al. | 283/75 |
| 2008/0316032 A1* | 12/2008 | Kia | 340/572.1 |
| 2009/0094872 A1* | 4/2009 | Ali et al. | 40/633 |
| 2009/0141138 A1* | 6/2009 | DeAngelis | 348/220.1 |
| 2009/0184806 A1* | 7/2009 | Kia | 340/10.52 |

* cited by examiner

*Primary Examiner* — John A Tweel, Jr.
(74) *Attorney, Agent, or Firm* — Sand & Sebolt

(57) ABSTRACT

A race management system which includes an RFID tag located between an inner and outer layer and is removably secured to a participant's bib through a mounting film. The inner layer is secured to a second inner layer having at least one fold line and an adhesive portion outward of the at least one fold line. The RFID tag is secured around a portion of the participant's shoe and is activated by at least one antenna to transmit identification data encoded on the tag. The encoded data corresponds to indicia printed on the bib and allows automatic collection of running times.

33 Claims, 6 Drawing Sheets

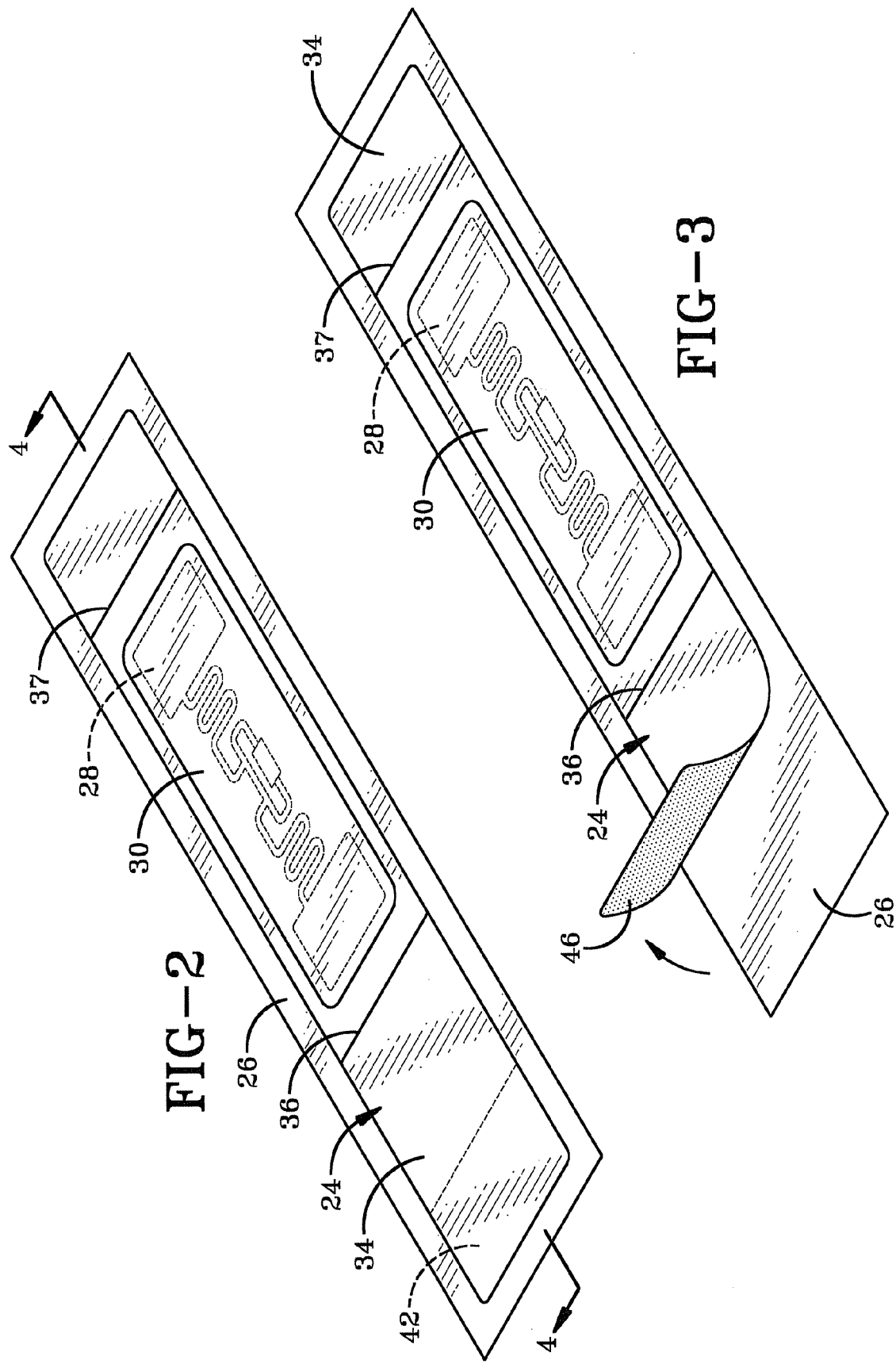

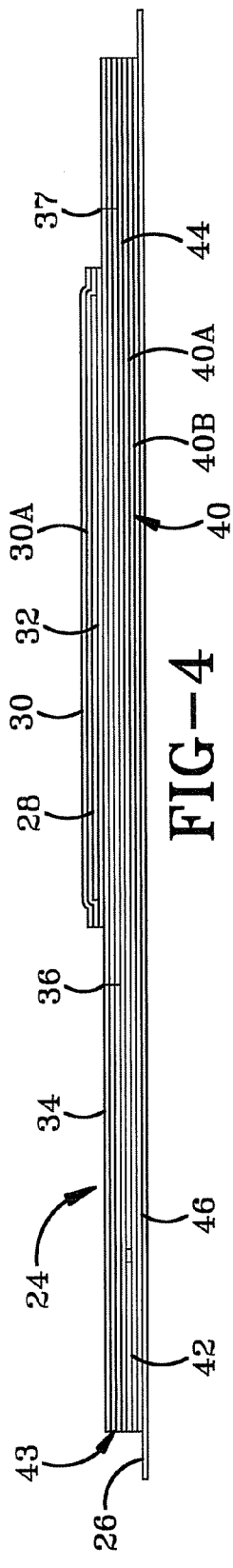
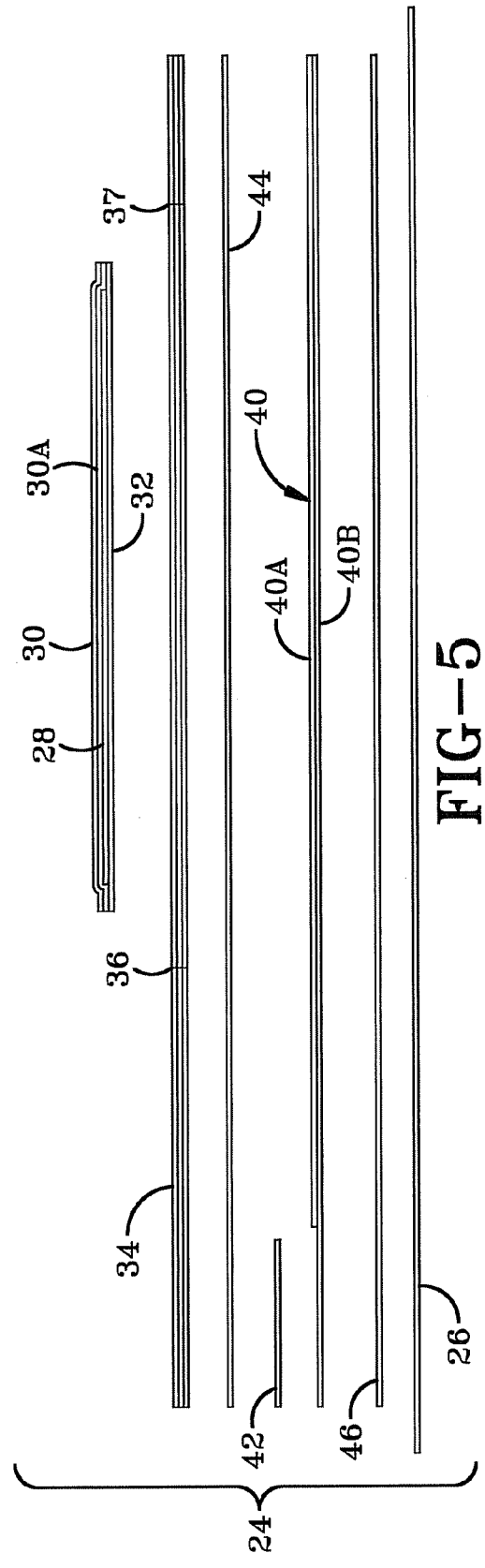
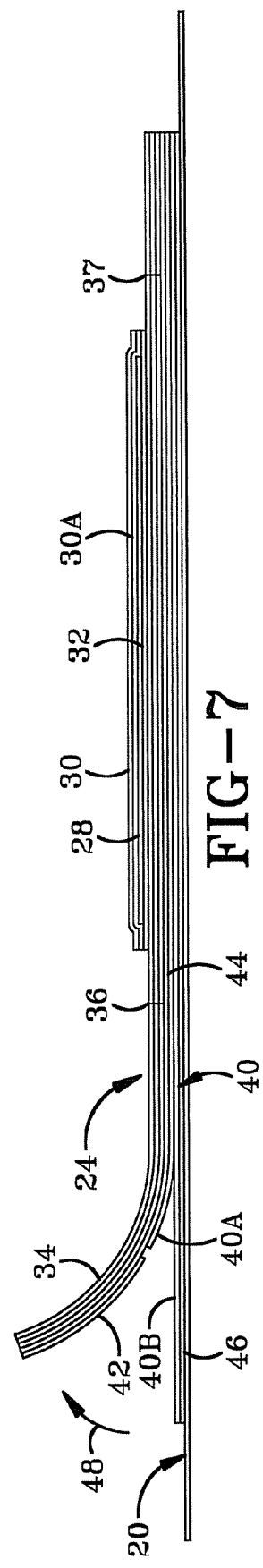

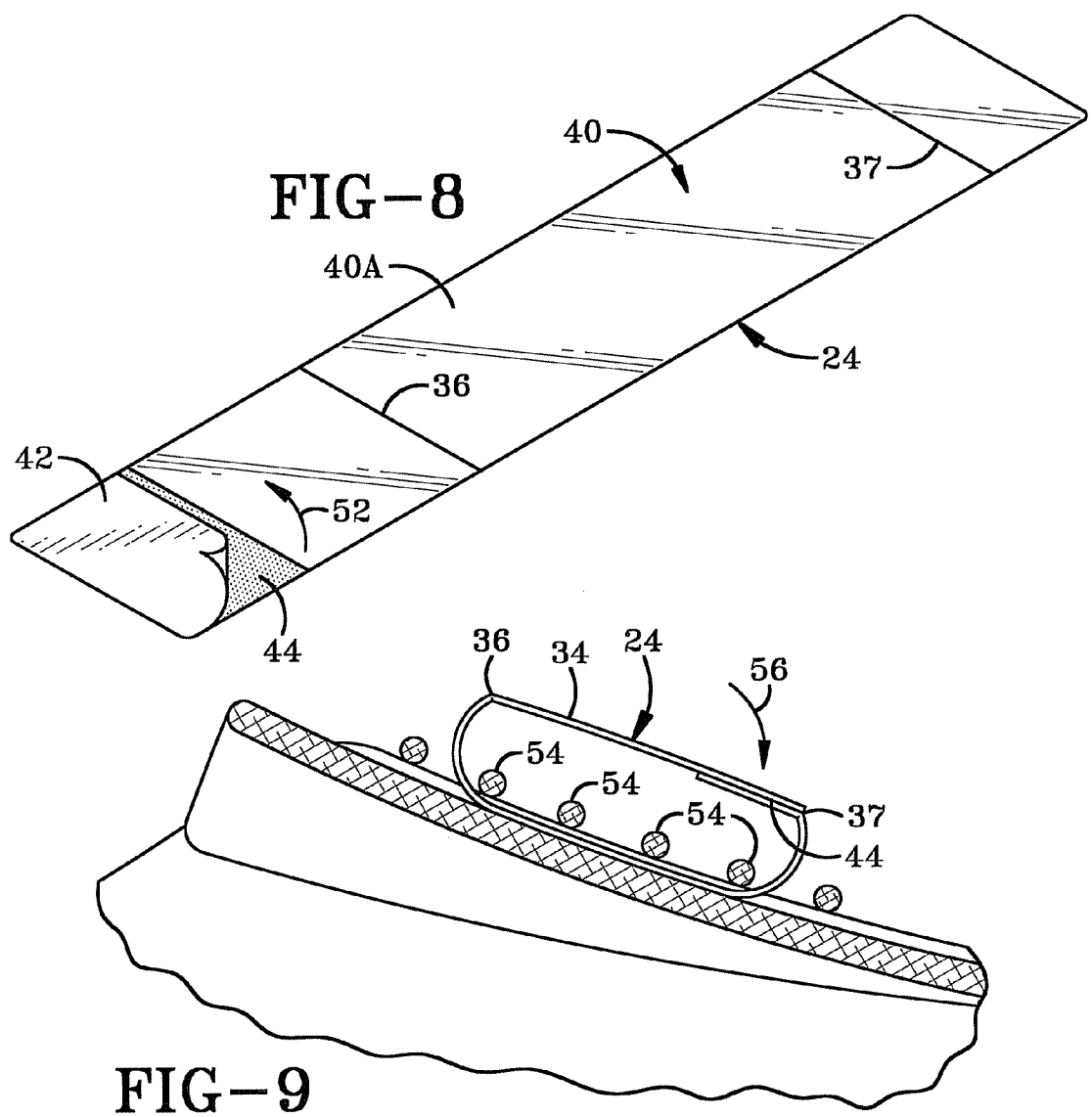
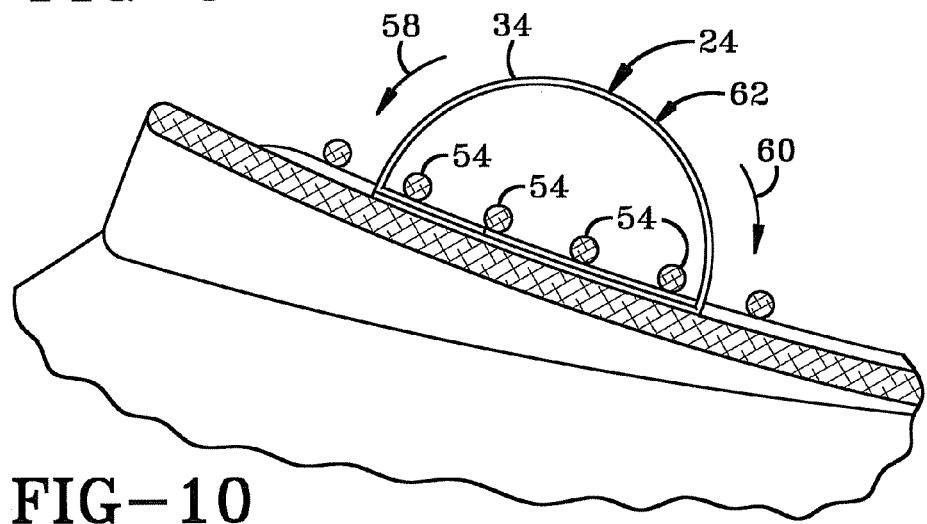

RFID TAG ASSEMBLY AND METHOD OF MANAGING A RACE

BACKGROUND OF THE INVENTION

1. Technical Field

The invention relates generally to a customizable RFID tag, race management system, and a method of managing a race. More particularly, the invention relates to an RFID tag that is attached to a bib and removable to secure the RFID tag to a race participant as well as coordinate user specific race, identification, and health information. Specifically, the invention relates to an embedded RFID tag which is secured to a bib and removed by the participant to secure around his/her shoelaces in order to provide participant start/stop times, medications, allergies, and other relevant medical information as well as relate the participant's race number to the participant's RFID tag.

2. Background Information

Race organizers have traditionally struggled to coordinate runners with their assigned running numbers due to the potentially large number of competitors. When competitors register for the race, they are generally assigned a bib with a number that can be affixed to their shirt. The number is associated with the runner's name, address, and medical information which may be maintained in a database. In well known races such as the Boston Marathon, more than 20,000 runners participate and the organizers are forced to write down the finishing time of each runner as he or she crosses the finish line. Thus, the industry is constantly in search of improvements that can reduce the number of organizers required to monitor the finish line and increase the efficiency of the finish line timing.

Once a race begins, there is generally only one official timer, meaning the runners who are 20,000 people behind the starting line are at a severe disadvantage since they must wait for all of the runners in front of them to begin running and cross the start line before they can begin the race. The runners not only have to travel a further distance, but also suffer from additional time being included in their race time. Thus, the industry is constantly in search of improvements that can provide more accurate race results for each individual runner so that each runner is able to accurately gauge his or her actual performance. Further, runners have not been able to measure and compare their individual performances at various stages throughout the race.

Marathons are endurance races that require a great deal of stamina and strength to finish. Unfortunately, not all runners are mentally and physically fit enough to finish the marathon. The runners may become dehydrated and eventually pass-out or injure themselves. In order to treat the injured or dehydrated runner, the organizers have to verify any medical information listed on his or her bib. Therefore organizers lose valuable seconds ensuring that they are fully aware of any medical issues the runner may have or will not be able to verify the runner's medical history if the bib were to fall off or become unreadable.

Finally, runners tend to perspire a great deal during a marathon and may cause any information located on the bib to bleed and become unreadable. Since, as mentioned above, it is very important that organizers have access to the medical and personal information on the bib; runners have been required to use certain writing instruments or special bibs that prevent the information from being washed away. Thus there is a demonstrated need for a race management system which is capable of accurately timing each individual runner at various stages of the race, can provide information about the runner as necessary, and capable of operating in a damp environment.

SUMMARY OF THE INVENTION

The race management system of the present invention comprises a bib arranged to receive printed indicia, a programmable tag secured between an outer layer and an inner layer, a mounting film fixedly secured to the bib, and the inner layer is releasably secured to the mounting film. The outer and inner layers further comprise a first end and at least one fold line. The inner layer includes an adhesive layer between the first end and the at least one fold line. The inner and outer layers further include at least one second fold line defining an outer portion and the adhesive portion is fixedly secured to the outer portion in a generally round nature. The race management system further includes printed indicia on the bib corresponding to data encoded in the programmable tag. An antenna may be disposed on the course which activates the programmable tag and the programmable tag transmits the encoded data to the antenna. Further, the bib and programmable tag are separable.

The method of managing a race of the present invention comprises locating a programmable tag between an outer layer and an inner layer, securing the inner layer to a second inner layer having an adhesive portion on a first end, releasably securing the second inner layer to a mounting film, fixedly securing the mounting film to a bib, and disposing at least one antenna on a race route. The method further includes printing indicia on the bib and encoding the programmable tag with data corresponding to the printed indicia. The method also includes removing the encoded programmable tag from the bib and locating the programmable tag underneath at least one securing object. The method further includes securing the adhesive portion to a second end of the second inner layer, rotating the adhesive portion of the programmable tag below the at least one securing object, and transmitting the data to the at least one antenna.

BRIEF DESCRIPTION OF THE DRAWINGS

The preferred embodiments of the invention, illustrative of the best modes in which Applicant has contemplated applying the principles of the invention, are set forth in the following description and are shown in the drawings.

FIG. 2 is a perspective view of a preferred embodiment RFID tag removably secured to a mounting film;

FIG. 3 is a perspective view of a preferred embodiment RFID tag being removed from the mounting film;

FIG. 4 is a sectional view of the preferred embodiment RFID tag taken generally along line 4-4 of FIG. 2;

FIG. 5 is an exploded view of the RFID tag of FIG. 4;

FIG. 7 is a sectional view of the preferred embodiment RFID tag being removed from the bib taken generally along line 7-7 of FIG. 6;

FIG. 8 is a perspective view of the back-side of a preferred embodiment RFID tag removed from the mounting film and the adhesive of the first end being exposed;

FIG. 9 is a sectional view of a preferred embodiment RFID tag inserted under four laces and the adhesive strip of the first end secured to the second end;

FIG. 10 is a sectional view of a preferred embodiment RFID tag being rotated so that the RFID tag is distal the laces;

DESCRIPTION OF THE PREFERRED EMBODIMENTS

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
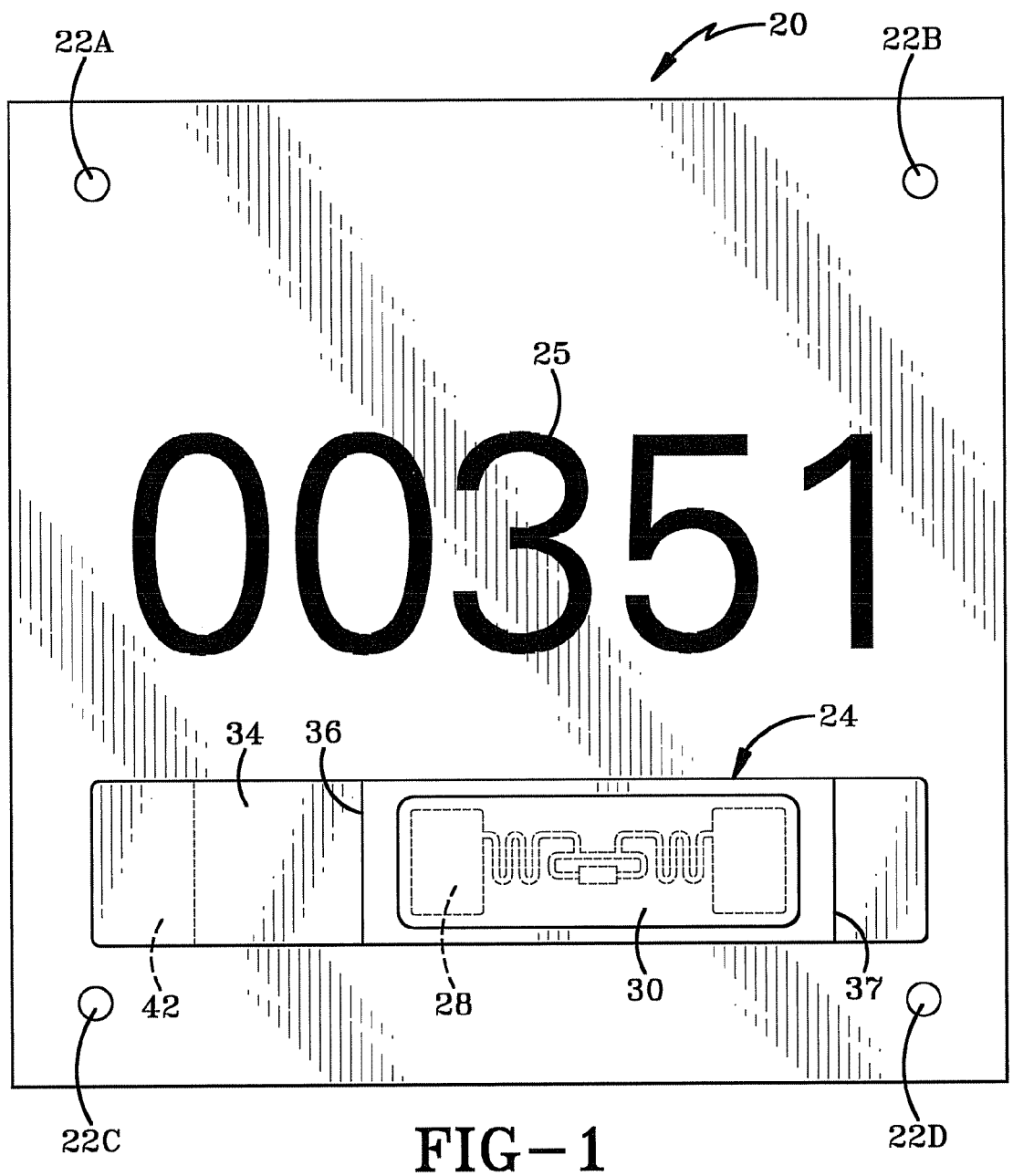
FIG. 1 is a front view of a front face of a preferred embodiment bib with a printed participant's number and an RFID tag removably secured.

The race management system of the present invention is indicated generally at bib 20, as is particularly shows in FIGS. 1, 2, and 3. Bib 20 is arranged to attach to a runner or participant through holes 22A, 22B, 22C, and 22D or with releasable adhesive (not shown). Bib 20 is a thin sheet and can be composed of paper, plastic, or other suitable material which is capable of being printed on. RFID tag assembly 24 is shown affixed to the front face of bib 20, but could also be affixed to the back face or any other side. The bib is further shown with indicia 25 printed on the front face.

In accordance with one of the main features of the present invention, the following should be viewed in light of FIGS. 2, 3, 4, and 5 which illustrate various views of a preferred embodiment RFID tag assembly 24. If RFID tag assembly 24 is shipped separately from bib 20, then RFID tag assembly 24 is originally removably secured to a top side of a mounting film 26 with a dry release, evaporative, or similar adhesive (described infra) until the manufacturer or participant peels the assembly upwards. Alternatively, RFID tag assembly 24 may be shipped directly attached to bib 20. In this situation, an adhesive layer must secure the RFID tag assembly to the bib, but leave a clean residual and adhesive-free surface when the assembly is removed. In this situation, the RFID tag assembly 24 tag must be removable from bib 20 while leaving a permanent adhesive layer and covering on bib 20 even once the RFID tag assembly 24 is removed.

Averting now to FIGS. 4 and 5, RFID tag assembly 24 preferably includes RFID tag 28 positioned between outer layer 30 and inner layer 32. RFID tag 28 is a typical passive radio-frequency identification device with an integrated circuit which can be encoded with data. The RFID tag does not have an internal power supply and is powered by a radio frequency emitted from an antenna (described infra). The RFID tag may then backscatter the emitted frequency to the antenna which provides the identification and encoded data of the RFID tag. While the RFID tag of the present invention has been described as a passive tag, it is within the spirit and scope of the present invention as claimed to incorporate an active, semi-active, or other powered RFID tag. Further, while the present invention is described incorporating an RFID tag, any programmable tag or chip may be used and is within the spirit and scope of the invention as claimed.

Outer layer 30 and inner layer 32 are preferably composed of polypropylene or other similarly suitable water-proof material which is approximately 2.6 mils, or approximately 2.6 thousandths of an inch thick. While a thickness of 2.6 mils is preferred for the inner and outer layers, the present invention is not limited to any particular thickness for each individual component or the RFID tag assembly collectively. Adhesive layer 30A assures that layers 30 and 32 are adhered to each other and to RFID tag 28.

In accordance with another of the main features of the invention, Inner layer 32 is fixedly secured to the top side of synthetic material 34 which is generally firm and provides support while maintaining flexibility. The synthetic material is stamped with fold lines 36 and 37 across the width, or shorter side, of RFID tag assembly 24. Fold lines 36 and 37 are located approximately one-half of an inch outward of RFID tag 28. The bottom side of synthetic material 34 may include a liner (not shown) which can be removed. In a preferred embodiment, all of the liner is removed except for approximately one-half of an inch at one end. Additional layer of permanent adhesive 44 secures intermediate layer 40 to synthetic material 34 on the area from which the liner was removed. Accordingly, intermediate layer 40 encompasses the majority of the bottom surface of synthetic material 34 and is on virtually the same plane as remaining one-half inch of liner 42 located on first end 43. The dry release, evaporative, or similar adhesive 46, described supra, is merged onto intermediate layer 40 and remaining one-half inch of liner 42 to removably secure the RFID tag to mounting film 26. More particularly, and referring to FIG. 7, intermediate layer 40 includes a top layer 40A and bottom layer 40B which are split apart as RFID tag 28 is removed from bib 20.

Figure 6:
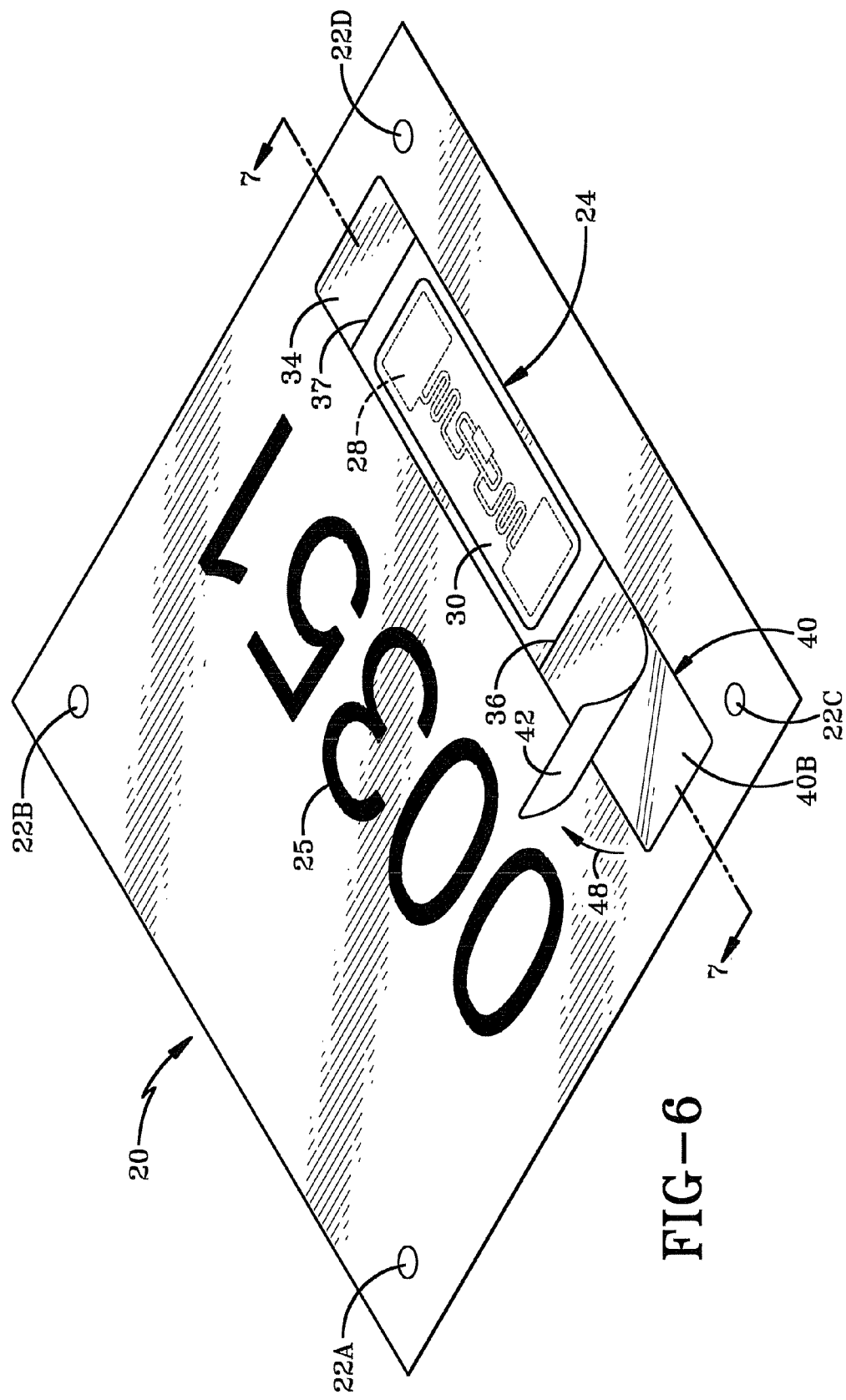
FIG. 6 is a perspective view of a preferred embodiment bib with a printed participant's number and an RFID tag being removed from the bib.

FIG. 6 is a perspective view of a preferred embodiment bib 20 with RFID tag assembly 24 being removed from bottom layer 40B of intermediate layer 40 in an upward and peeling motion in the direction indicated by arrow 48. FIG. 7 is a sectional view taken generally along line 7-7 in FIG. 6 with RFID tag assembly 24 being removed from bottom layer 40B which is in turn permanently secured to bib 20 with adhesive 46.

RFID tag assembly 24 is then applied to bib 20 which may include indicia 25 printed thereon. If the RFID tag assembly is applied to a bib that already includes indicia 25, then the RFID tag assembly will be printed and encoded with the number or data corresponding to indicia 25. If bib 20 does not include indicia 25 at this point, then the combination bib and RFID tag assembly are sent through a process which encodes the RFID tag with a number or data that corresponds to indicia that is printed on the bib during the same process.

Averting to FIG. 8, RFID tag assembly 24 is shown removed from bottom 40B of intermediate layer 40 and turned upside-down. The participant then removes liner 42 in the direction indicated by arrow 52 to expose adhesive 44. Although adhesive 44 has been described as permanent, it is within the spirit and scope of the present invention as claimed to include a semi-permanent adhesive, a releasable adhesive, or a hook and loop connection which allows the RFID tag assembly to remain securely fastened to the participant during use and still be removed.

As can be seen, the applicant envisions that RFID tag assembly 24 may be shipped on attached mounting film 26 as is shown in FIGS. 4 and 5. If the product is shipped not attached to bib 20, then top layer 40A will have to be removed from bottom layer 40B which remains attached to mounting film 26. Alternatively, RFID tag assembly 24 may be shipped applied directly to bib 20 such that mounting film 26 exists only in the factory and is not seen by the race participant.

FIGS. 9 and 10 illustrate RFID tag assembly 24 being secured to a participant's shoe prior to a race. After liner 42 is removed and adhesive 44 is exposed, the participant inserts RFID tag assembly 24 in an upside-down orientation underneath laces 54 of his/her shoe. The participant then folds RFID tag assembly 24 first along fold line 37 and then along fold line 36 in the direction of arrow 56 to encircle laces 54 and secure the assembly with adhesive 44.

The participant then rotates RFID tag assembly 24 in the direction of arrow 58 or 60 so that the bowed portion 62 of the RFID tag assembly projects away from laces 54. Advantageously, in the preferred embodiment, the offset arrangement of the fold lines ensures that bowed portion 62, which houses the RFID tag, is less likely to be affected by the damp environment created by wet or sweaty shoes since the RFID tag is spaced away from the participant's body and/or shoes. In addition, the RFID tag is able to receive the antenna radio frequency and transmit data more efficiently in the bowed arrangement.

Figure 11:
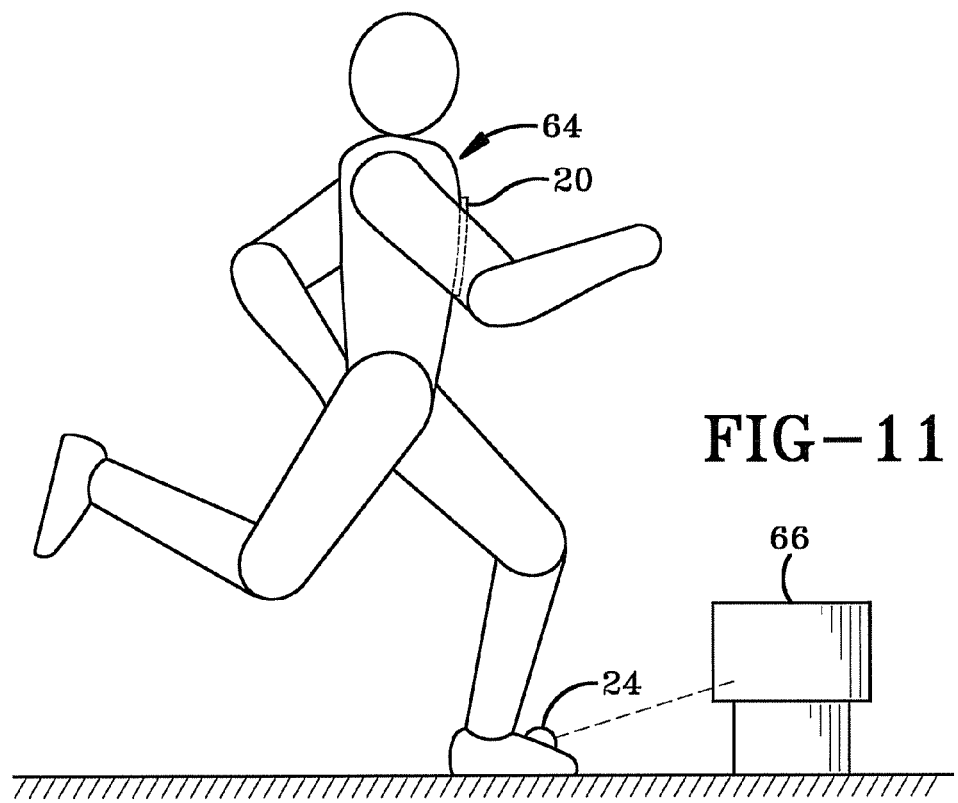
FIG. 11 is a side view of a participant with a present invention RFID tag secured to the participant's shoe and being activated by an antenna; and, FIG. 12 is a side view of a participant with a present invention bib having an RFID tag removably secured thereon and being activated by an antenna.
Figure 12:
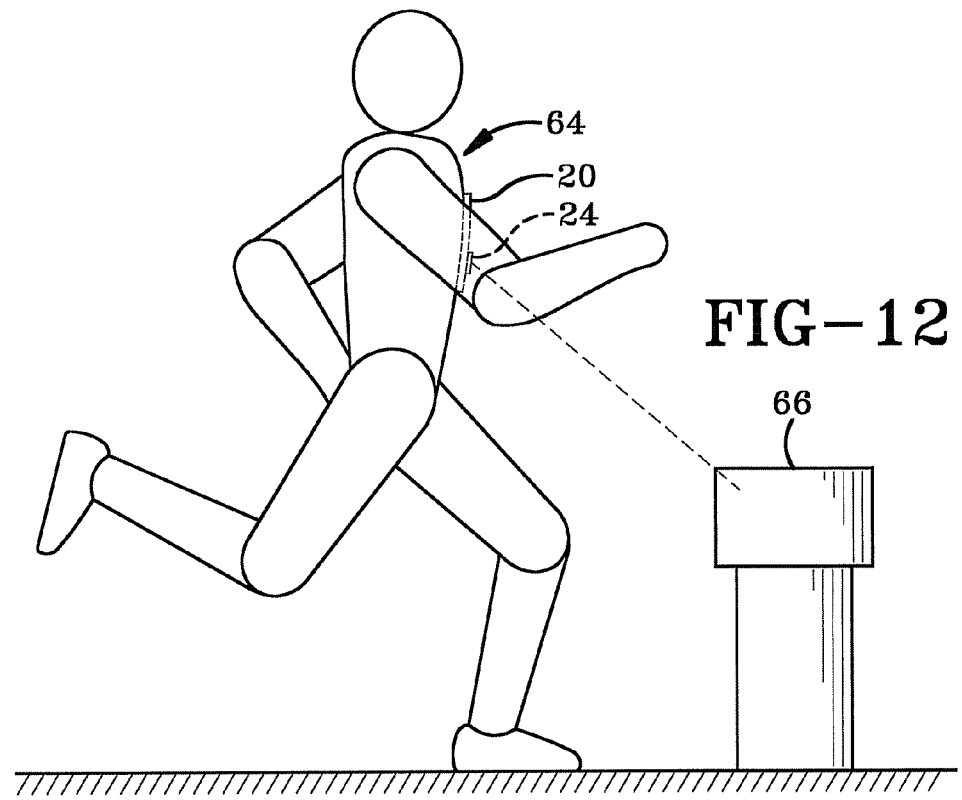

FIGS. 11 and 12 illustrate preferred embodiments of the present invention with participant 64 running past antenna 66. FIG. 11 shows RFID tag assembly 24 secured to the participant's shoe as described infra and antenna 66 emitting a radio frequency which powers RFID tag assembly 24 and transmits the data encoded in the RFID tag back to the antenna.

FIG. 12 shows participant 64 wearing bib 20 with RFID tag assembly 24 secured to the bib. The RFID tag assembly operates in a fashion similar to the preferred embodiment illustrated in FIG. 11, with the exception of antenna 66 location. Since the RFID tag is located on the chest of the participant, antenna 66 must be elevated to ensure that the RFID tag receives the radio frequency emitted by the antenna.

Although the present invention has been described as secured through at least one lace, it is within the spirit and scope of the present invention as claimed to be secured to any suitable portion of a participant, including but not limited to a shoe, bracelet, belt, wrist or ankle.

Having now described the structure and method of manufacturing the RFID tag assembly and the bib, a method of managing a race will be described in detail.

Participant 64 is assigned an identification number which corresponds to indicia 25 and the data encoded on RFID tag 28. First, RFID tag 28 is located between outer layer 30 and inner layer 32. Next, inner layer 32 is secured to synthetic material 34 and the synthetic material is releasably secured to bib 20 which has indicia 25 corresponding to the participant's identification number printed thereon. RFID tag 28 is then encoded with data corresponding to the participant's assigned identification number.

Prior to the race beginning, the participant removes the encoded RFID tag from the bib and encircles at least one lace by securing adhesive 44 to RFID tag assembly 24. The participant then rotates the RFID tag assembly in the direction of arrow 58 or 60 to project bowed portion 62 away from laces 54. Further, radio frequency emitting antennas 66 are disposed at multiple locations throughout the course, including but not limited to, the start line and the finish line.

After the race begins, the antennas are activated and as participant 64 passes antenna 66, the RFID tag 28 is powered by antenna 66 and participant's identification number encoded in the tag is transmitted back to the antenna and records the participant's start or stop time, as applicable.

Further, a plurality of antennas may be disposed throughout the course to provide participant's with various sectional completion times.

Further, RFID tag 28 may include health information such as medications the participant is currently taking, allergies, blood type, and medical insurance carrier. If a participant were to be injured or pass out, a race coordinator or medic would be able to activate the RFID tag and obtain all of the necessary information to treat the participant without losing valuable time. However, in the preferred embodiment, RFID tag 28 would include a five-digit number that is related to or exactly corresponds to indicia printed on bib 20. This number would correspond to an electronic file in a data base to allow race managers to access a variety of information available about the race participant which may include, but is not limited to, medical information, necessary allergies and the like, as well as citizenship, telephone number, next of kin and address. However, a variety of information could be provided without departing from the spirit of the present invention.

Accordingly, the RFID tag assembly is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the RFID tag is constructed and used, the characteristics of the construction, and the advantageous new and useful results obtained; the new and useful structures, devices, elements, arrangement, parts, combinations, and methods are set forth in the appended claims.

What is claimed is:

1. A race management system comprising:
    a racing bib adapted to be secured to a first article of an athlete's clothing;
    a mounting film secured to the bib; and
    a tag assembly removably engaged with the mounting film and separable therefrom; and wherein the tag assembly, when separated from the mounting film, is adapted to be secured to one of a second article of the athlete's clothing and a part of the athlete's body; and wherein the tag assembly comprises:
        a mounting assembly removably engagable with the mounting film; and
        a tag member fixedly engaged with the mounting assembly, and wherein the tag member comprises:
            an inner layer made from a waterproof material
            an outer layer made from a waterproof material; wherein the inner and outer layers are sealed together along their perimeters;
            an enclosure defined between the inner and outer layers, and
            a programmable tag disposed within the enclosure.

2. The race management system of claim 1, further comprising indicia printed on said bib, and data corresponding to said indicia is encoded in said programmable tag.

3. The race management system of claim 2 further comprising an antenna positioned along a race route, wherein said antenna activates said encoded tag assembly to transmit said encoded data to said antenna.

4. The race management system of claim 1, wherein said programmable tag is an electronic chip.

5. The race management system of claim 1, wherein said programmable tag is a radio frequency identification tag.

6. The race management system as defined in claim 1, further comprising a first adhesive disposed within the enclosure and between the programmable tag and at least one of the inner and outer layers.

7. The race management system as defined in claim 6, wherein the mounting assembly comprises:
   an upper layer secured to the inner layer of the tag assembly;
   a lower layer disposed in abutting contact with the mounting film on the bib; and
   a second adhesive layer disposed between the upper and lower layers.

8. The race management system as defined in claim 7, further comprising an intermediate layer disposed between the second adhesive layer and the lower layer.

9. The race management system as defined in claim 8, wherein the second adhesive layer permanently secures the upper layer and intermediate layer together.

10. The race management system as defined in claim 8, wherein the upper layer has a first end and a second end, and the lower layer has a first end and a second end, and the first ends of the upper and lower layers are substantially aligned, and the second ends of the upper and lower layers are substantially aligned.

11. The race management system as defined in claim 10, wherein the intermediate layer has a first end and a second end, and the second end of the intermediate layer is aligned with the second ends of both of the upper and lower layers.

12. The race management system as defined in claim 11, wherein the first end of the intermediate layer is positioned a distance inwardly away from the aligned first ends of the upper and lower layers.

13. The race management system as defined in claim 12, further comprising a backer strip, wherein the backer strip is disposed over a section of the second adhesive layer disposed between the aligned first ends of the upper and lower layers and the first end of the intermediate layer; and wherein the backer strip is only revealed when the mounting assembly is disengaged from the mounting film and the lower layer of the mounting assembly is removed.

14. The race management system as defined in claim 13, wherein the second adhesive layer releasably secures the backer strip to the upper layer.

15. The race management system as defined in claim 14, further comprising a third adhesive layer, wherein the third adhesive layer is disposed between the lower layer of the mounting assembly and the mounting film.

16. The race management system as defined in claim 15, wherein the third adhesive layer penetrates the lower layer and secures the lower layer to the intermediate layer and secures the lower layer to the mounting film.

17. The race management system as defined in claim 16, wherein the adhesive layer releasably secures the lower layer to the mounting film and releasably secures the lower layer to the intermediate layer.

18. The race management system as defined in claim 17, wherein at least a portion of the third adhesive layer remains on the mounting film when the mounting assembly is removed therefrom.

19. The race management system as defined in claim 17, wherein the upper layer has a first fold disposed a distance inwardly from the first end of the intermediate layer and toward the second end of the upper layer.

20. The race management system as defined in claim 19, wherein the first fold is disposed substantially parallel to the first and second ends of the upper layer.

21. The race management system as defined in claim 19, wherein the upper layer has a second fold spaced a distance inwardly from the second end of the upper layer and spaced a distance apart from the first fold.

22. The race management system as defined in claim 21, and wherein the second fold is substantially parallel to the first fold.

23. The race management system as defined in claim 22, wherein the tag assembly is foldable about one or both of the first and second folds to bring the section of the upper layer covered by the backer strip into contact with a region of the intermediate layer adjacent the second end thereof.

24. The race management system as defined in claim 23, wherein the tag assembly is adapted to be wrapped around one of a portion of the second article of the athlete's clothing and the part of their body, and when so wrapped and the backer strip has been removed, the section of the upper layer is secured by a portion of the second adhesive layer to the region of the intermediate layer.

25. The race management system as defined in claim 1, further comprising at least one antenna disposed on a racing course, said antenna being configured to one or both of transmit and receive signals from the programmable tag.

26. The race management system as defined in claim 25, further including a computer adapted to store and compile data received as output from the programmable tag.

27. A method of managing a race comprising the steps of:
   locating a programmable tag between a waterproof outer layer and a waterproof inner layer to form a tag member;
   securing said inner layer of the tag member to a mounting assembly to form a tag assembly;
   releasably securing the tag assembly to a mounting film;
   fixedly securing said mounting film to a racing bib; and
   disposing at least one antenna on a race route.

28. The method of claim 27 further comprising the steps of:
   printing indicia on said racing bib; and
   encoding said programmable tag with data corresponding to said indicia.

29. The method of claim 28 further comprising the steps of:
   removing said encoded programmable tag from said racing bib; and
   engaging said encoded programmable tag with one of an article of the athlete's clothing and a part of the athlete's body.

30. The method of claim 28 further comprising the steps of:
   activating said encoded programmable tag with said at least one antenna; and
   transmitting said encoded data from the programmable tag to said at least one antenna.

31. The method of claim 29, wherein the step of engaging the encoded programmable tag with the one of the article of the athlete's clothing and the part of the athlete's body further includes the steps of:
   threading the tag assembly beneath an article of the athlete's clothing such that the programmable tag faces inwardly toward the article of the athlete's clothing and the inner layer of the mounting assembly faces outwardly;

folding a first end of the mounting assembly inwardly over the inner layer and toward a second end of the mounting assembly;

removing the inner layer to reveal an intermediate layer; and removing a backer strip from the folded first end of the intermediate layer to reveal an adhesive portion.

32. The method of claim 31 further comprising the step of:

securing said adhesive portion to a second end of an intermediate layer of said mounting assembly to form a substantially D-shaped member.

33. The method of claim 32, further comprising the steps of:

rotating said mounting assembly on said article of clothing until said programmable tag faces outwardly away from said article of clothing and said tag is disposed on a curved outer surface of the D-shaped member; and transmitting said data to said at least one antenna.

* * * * *